United States Patent Office 3,531,484
Patented Sept. 29, 1970

3,531,484
1-(3-AMINOPYRAZINOYL)-4,5,5-TRISUBSTITUTED BIGUANIDE PRODUCTS
John B. Bicking and Edward J. Cragoe, Jr., Lansdale, Pa., assignors to Merck & Co., Inc., Rahway, N.J., a corporation of New Jersey
No Drawing. Filed Feb. 14, 1968, Ser. No. 705,273
Int. Cl. C07d 51/76
U.S. Cl. 260—250
6 Claims

ABSTRACT OF THE DISCLOSURE 1-(3-aminopyrazinoyl)-4,5,5-trisubstituted biguanides having natriuretic properties but substantially devoid of kaliuretic properties and optionally having a substituent group attached to one or both of the 5- and 6-positions of the pyrazine nucleus are prepared by the reaction of the selected biguanide with a lower alkyl ester of a 3-aminopyrazinoic acid.

---

This invention is concerned with novel (3-aminopyrazinoyl)-4,5,5-trisubstituted biguanide products as well as methods for their preparation. The pyrazinoylbiguanide products of this invention possess useful diuretic properties but more importantly they selectively enhance the excretion of sodium and chloride ions while not influencing to any significant degree the excretion of potassium. The products prepared by the process of this invention are therefore useful in the treatment or management of edema and other abnormalities resulting from the retention of excess quantities of sodium and fluid by the animal organism. The products are effective when administered intraperitoneally as aqueous suspensions to the rat at a dosage of between 25 to 100 mg./kg. without producing any signs of toxicity.

The products of this invention can be prepared by the method illustrated below:

METHOD

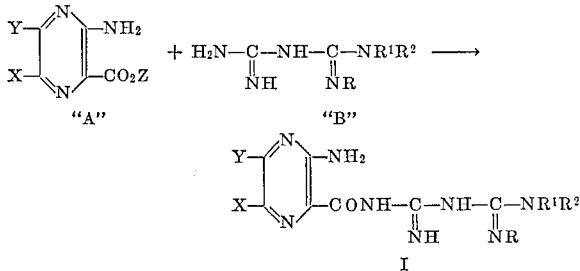

The preferred compounds prepared as illustrated above are those having Structure I wherein X is hydrogen or a halogen, preferably chloro, bromo or iodo, Y is hydrogen or a amino group having the structure —NR³R⁴ wherein R³ and R⁴ can be the same or dissimilar groups selected from hyrogen, lower alkyl advantageously having from one to five carbon atoms as methyl, ethyl, propyl, isopropyl, butyl, amyl, or any of the branched four or five carbon alkyl groups, lower alkenyl or alkynyl advantageously having from three to five carbon atoms and particularly the allyl, propargyl or 3-pentenyl and the like, or a lower(cycloalkyl-alkyl), C₄₋₈, or lower cycloalkyl, C₃₋₆, group advantageously the cyclopropyl, cyclobutyl, cyclopropylmethyl, cyclopentylmethyl, cyclohexylmethyl, cyclohexylethyl, cyclopropylethyl, and the like; R is lower alkyl advantageously having one to three carbon atoms such as methyl, ethyl and propyl or halophenyl particularly the chlorophenyl radical and each of the variables R¹ and R² separately represent lower alkyl advantageously having from one to three carbon atoms and preferably the methyl, ethyl, propyl or isopropyl groups. The variable radicals R, R¹, R², X and Y appearing in the structures of the products identified as "A" and "B" in the reaction scheme have the above meanings. The variable radical Z in Structure "A" is an ester forming group, advantageously a lower alkyl, and for all practical purposes can be methyl.

These compounds are prepared according to the method illustrated either by fusing reactants "A" and "B" or by preparing a solution of reactants "A" and "B" in a lower alkanol such as methanol, ethanol, isopropyl alcohol, butanol or other solvent, preferably under anhydrous conditions. The desired product I usually is recovered from the cooled reaction mixture by trituration with water, and if desired, purified by converting the product to a salt which then is recrystallized, or the free base can be regenerated by addition of aqueous alkali. The starting substance "A" in most instances is a known compound. However, if desired it can be prepared by one of several methods, some of which are described in U.S. Pat. No. 3,313,813. The biguanides also in most instances are known or can be prepared by the methods described by K. H. Slotta et al. in Ber. 62B, 1390 (1929), by R. Ashworth et al. in J. Chem. Soc. 475 (1949) and by H. C. Carrington et al. in J. Chem. Soc. 1017 (1954). In some instances it may be desirable to make a salt of these compounds using a pharmaceutically acceptable acid such as hydrochloric, hydrobromic, sulfuric, maleic, lactic and the like, and these salts are to be considered as included in this invention and within the scope of the claims.

The products of this invention can be administered orally in the form of powders, pills, tablets, capsules, elixirs and the like or can be injected in physiologically acceptable fluids. These dosage forms are prepared by conventional methods by admixing the active ingredient with diluents, extenders, lubricants and/or other materials normally employed in the preparation of formulations.

The following examples will describe in more particularity the process for preparing the compounds of this invention. The examples are not, however, to be considered as limiting the invention to the particular procedural conditions employed or to the particular compounds prepared thereby. The melting points that are given are corrected values.

EXAMPLE 1

1-(3-aminopyrazinoyl)-4,5,5-trimethylbiguanide

To a solution of sodium (1.38 g.-atom, 0.06 mole) in isopropyl alcohol (50 ml.) is added 1,1,3-trimethylbiguanide hydrobromide (14.80 g., 0.066 mole). The resulting suspension containing 1,1,3-trimethylbiguanide as the free base is stirred at room temperature for 30 minutes, filtered and the filtrate concentrated to a volume of 25 ml. under reduced pressure. Methyl 3-aminopyrazinoate (3.06 g., 0.02 mole) then is added and the resulting suspension is heated under reflux with stirring for three hours, whereupon the mixture is cooled to room temperature and the yellow solid collected and dried giving 4.72 g. (89%) of 1-(3-aminopyrazinoyl)-4,5,5-trimethylbiguanide, M.P. 191–193° C. The product is dissolved in dilute hydrochloric acid, filtered and reprecipitated with 20% sodium hydroxide solution to give purified material melting at 197–198° C.

*Analysis*—Calculated for $C_{10}H_{16}N_8O$ (percent): C, 45.44; H, 6.10; N, 42.40. Found (percent): C, 45.63; H, 5.87; N, 42.19.

EXAMPLE 2

1-(3,5-diamino-6-chloropyrazinoyl)-4,5,5-trimethylbiguanide hydrobromide

To a solution of sodium (1.38 g.-atom, 0.06 mole) in methanol, (40 ml.) is added 1,1,2-trimethylbiguanide hydrobromide (14.80 g., 0.066 mole) and the resulting suspension is stirred at room temperature for 30 minutes, then concentrated to a paste under reduced pressure and the residue containing 1,1,2-trimethylbiguanide treated with n-butyl alcohol (30 ml.). Methyl 3,5-diamino-6-chloropyrazinoate (4.06 g., 0.02 mole) then is added and the resulting suspension heated on a steam bath with stirring for one hour whereupon the mixture is chilled in an ice bath and filtered. The collected solid is suspended in water (40 ml.) and neutralized by the addition of 48% hydrobromic acid solution. The yellow anhydrous solid is collected and dried giving 7.90 g. (100%) of 1-(3,5-diamino-6-chloropyrazinoyl)-4,5,5-trimethylbiguanide hydrobromide, M.P. 241–245° C. Recrystallization from ethanol provides the product as light yellow needles, M.P. 262.5–263.5° C.

*Analysis.*—Calculated for $C_{10}H_{16}ClN_9O \cdot HBr$ (percent): C, 30.43; H, 4.34; N, 31.94. Found (percent): C, 30.68; H, 4.16; N, 31.83.

EXAMPLE 3

1-(3,5-diamino-6-bromopyrazinoyl)-4,5,5-trimethylbiguanide hydrobromide

By following the procedure described in Example 2 but replacing the methyl 3,5-diamino-6-chloropyrazinoate by an equimolecular quantity of methyl 3,5-diamino-6-bromopyrazinoate and following substantially the procedure described in Example 2 there is obtained 1-(3,5-diamino - 6 - bromopyrazinoyl) - 4,5,5 - trimethylbiguanide hydrobromide.

Similarly, following the procedure described in Example 2 but replacing the methyl 3,5-diamino-6-chloropyrazinoate by methyl 3,5-diamino-6-iodopyrazinoate, methyl 3-amino-6-chloropyrazinoate and then by methyl 3-amino-6-bromopyrazinoate and employing substantially equivalent quantities of reactants and following substantially the reaction conditions described in Example 2 there is obtained, respectively, 1 - (3,5 - diamino - 6 - iodopyrazinoyl) - 4,5,5 - trimethylbiguanide hydrobromide, 1 - (3 - amino - 6 - chloropyrazinoyl) - 4,5,5 - trimethylbiguanide hydrobromide, and 1 - (3 - amino - 6 - bromopyrazinoyl) - 4,5,5 - trimethylbiguanide hydrobromide.

EXAMPLE 4

1-(3,5-diamino-6-chloropyrazinoyl)-4-(p-chlorophenyl)-5,5-dimethylbiguanide hydrobromide The above product is prepared following the procedure described in Example 2 except that the 1,1,2-trimethylbiguanide is replaced by an equimolecular quantity of 1,1-dimethyl-2-(p-chlorophenyl)biguanide.

Similarly, by following the procedure identified in Example 3 but replacing the methyl 3,5-diamino-6-chloropyrazinoate with an equimolecular quantity of methyl 3,5-diamino-6-bromopyrazinoate, methyl 3-amino-6-chloropyrazinoate and methyl 3-amino-6-bromopyrazinoate there is obtained, respectively, 1 - (3,5 - diamino - 6 - bromopyrazinoyl) - 4 - (p-chlorophenyl)-5,5-dimethylbiguanide hydrobromide, 1 - (3 - amino - 6 - chloropyrazinoyl) - 4 - (p - chlorophenyl)-5,5-dimethylbiguanide hydrobromide, and 1 - (3 - amino - 6 - bromopyrazinoyl) - 4 - (p - chlorophenyl)-5,5-dimethylbiguanide hydrobromide.

EXAMPLE 5

1-(3-,5-diamino-6-chloropyrazinoyl)-4-(p-chlorophenyl)-5,5-diethylbiguanide hydrobromide The above product also is prepared by the process described in Example 2 except the 1,1,2-trimethylbigua-

TABLE

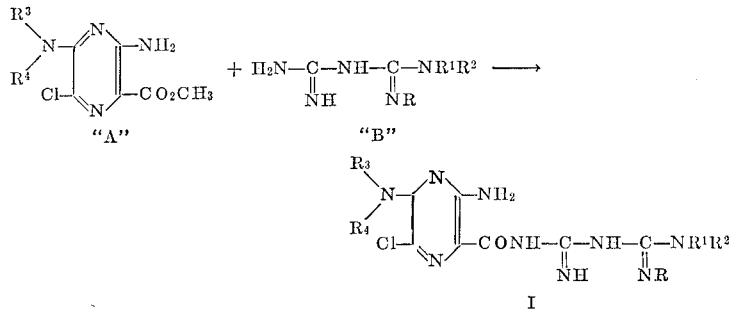

| $R^3$ | $R^4$ | R | $R^1$ | $R^2$ |
|---|---|---|---|---|
| $(CH_3)_2CH$ | H | $CH_3$ | $CH_3$ | $CH_3$ |
| $CH_3CH_2\overset{CH_3}{\underset{|}{C}H}$ | H | $Cl-\langle \rangle-$ | $CH_3$ | $CH_3$ |
| $CH_3(CH_2)_3$ | H | $CH_3$ | $CH_3$ | $CH_3$ |
| $CH_2=CHCH_2$ | H | $CH_3$ | $CH_3$ | $CH_3$ |
| $CH\equiv C-CH_2$ | H | $Cl-\langle \rangle-$ | $CH_3CH_2$ | $CH_3CH_2$ |
| $\langle H \rangle-CH_2$ | H | $CH_3$ | $CH_3$ | $CH_3$ |
| $\langle H \rangle-$ | H | $Cl-\langle \rangle-$ | $CH_3$ | $CH_3$ |
| $CH_3$ | $CH_3$ | $CH_3$ | $CH_3$ | $CH_3$ |
| $CH_3$ | $CH_3CH_2$ | $CH_3$ | $CH_3$ | $CH_3$ |
| $CH_3$ | $CH_3(CH_2)_2$ | $CH_3$ | $CH_3$ | $CH_3$ |
| $CH_3$ | $(CH_3)_2CH$ | $Cl-\langle \rangle-$ | $CH_3CH_2$ | $CH_3CH_2$ |
| $CH_3CH_2$ | $CH_3CH_2$ | $Cl-\langle \rangle-$ | $CH_3CH_2$ | $CH_3CH_2$ | nide is replaced by an equimolecular quantity of 1,1-diethyl-2-(p-chlorophenyl)biguanide.

The following products are obtained by the method followed in Example 4 except that the methyl 3,5-diamino-6-chloropyrazinoate is replaced by an equimolecular quantity of methyl 3,5-diamino-6-bromopyrazinoate, methyl 3-amino-6-chloropyrazinoate and methyl 3-amino-6-bromopyrazinoate, respectively.

1 - (3,5 - diamino - 6 - bromopyrazinoyl) - 4 - (p - chlorophenyl)-5,5-diethylbiguanide,
1 - (3 - amino - 6 - chloropyrazinoyl) - 4 - (p - chlorophenyl)-5,5-diethylbiguanide, and
1 - (3 - amino - 6 - bromopyrazinoyl) - 4 - (p - chlorophenyl)-5,5-diethylbiguanide.

Other 1-(3-amino-5-substituted amino-6-chloropyrazinoyl)-4,5,5-trisubstituted biguanide products prepared by the process described in Examples 1 or 2 are identified in the following table. The reaction employed in preparing these compounds is illustrated in the heading of the following table. The products are prepared by reacting the pyrazinoate of structure "A" with a biguanide of structure "B" by substantially the same procedure described in Example 1 or Example 2 to obtain the free base or the hydrobromide salt of the product, respectively. Each of the intermediate products "A" or "B" have the substituent group identified for it in the table under the heading $R^3$, $R^4$ and R thus forming the pyrazinoylbiguanide end product having the structure I.

What is claimed is:

1. Pyrazinoylbiguanide products of the structure

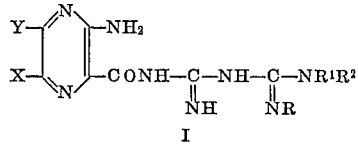

I wherein Y is selected from the group consisting of hydrogen and an amino group of the structure —$NR^3R^4$ in which $R^3$ and $R^4$ are separately selected from the group consisting of hydrogen, lower alkyl, lower alkenyl, lower alkinyl, $C_{3-6}$ cycloalkyl, $C_{4-8}$ cycloalkylalkyl; X is selected from the group consisting of hydrogen and halo; R is selected from the group consisting of lower alkyl and chlorophenyl; $R^1$ is the lower alkyl and $R^2$ is lower alkyl.

2. A pyrazinoylbiguanide as claimed in claim 4 wherein Y is amino and X, R, $R^1$ and $R^2$ have the meaning assigned to each in claim 1.

3. A pyrazinoylbiguanide as claimed in claim 1 wherein Y is amino, X is chloro and R, $R^1$ and $R^2$ are each methyl.

4. A pyrazinoylbiguanide as claimed in claim 1 wherein X is chloro, Y, $R^1$ and $R^2$ have the meaning assigned to each in claim 1, and R is p-chlorophenyl.

5. A pyrazinoylbiguanide as claimed in claim 1 wherein Y is amino, X is chloro, R is p-chlorophenyl, and $R^1$ and $R^2$ are each methyl.

6. A pyrazinoylbiguanide as claimed in claim 1 wherein Y is amino, X is chloro, R is p-chlorophenyl, and $R^1$ and $R^2$ are each ethyl.

References Cited

UNITED STATES PATENTS 3,360,517   12/1967   Cragoe _____ 260—250

NICHOLAS S. RIZZO, Primary Examiner

U.S. Cl. X.R.

424—250

UNITED STATES PATENT OFFICE
CERTIFICATE OF CORRECTION

Patent No. 3,531,484     Dated September 29, 1970

Inventor(s) John B. Bicking and Edward J. Cragoe, Jr.

It is certified that error appears in the above-identified patent and that said Letters Patent are hereby corrected as shown below:

In the Table in column 4, correct the ring structure in formula I to read as follows

In column 6, line 10, change the dependency of Claim 2 from "claim 4" to read --Claim 1--.

SIGNED AND
SEALED
JAN 12 1971

(SEAL)
Attest:

Edward M. Fletcher, Jr.
Attesting Officer

WILLIAM E. SCHUYLER, JR.
Commissioner of Patents